April 19, 1960  S. LISIAK  2,933,099
COMBINED TIRE INFLATION VALVE AND INDICATOR
Filed April 16, 1956
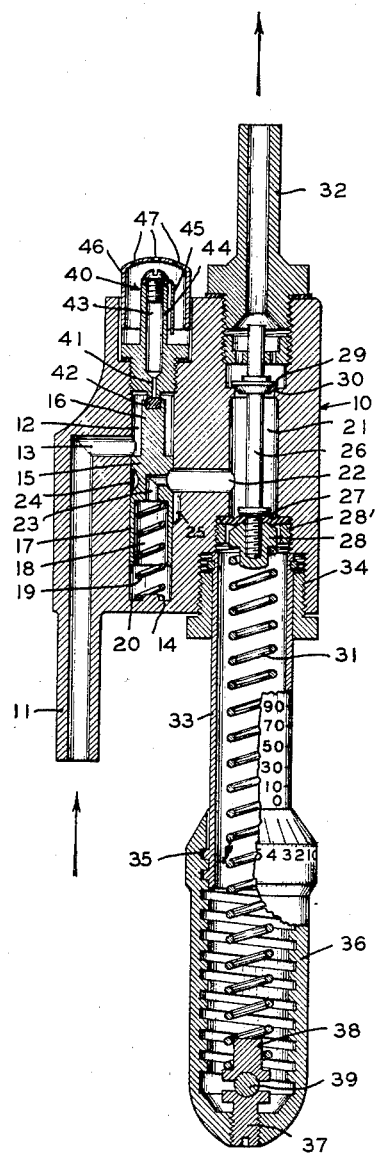
INVENTOR
SERGIO LISIAK
BY Ivan P. Tashof
ATTORNEY 2,933,099
COMBINED TIRE INFLATION VALVE AND INDICATOR Sergio Lisiak, Montevideo, Uruguay Application August 16, 1956, Serial No. 578,354

11 Claims. (Cl. 137—227)

The present invention relates to automatic valve apparatus particularly adapted for utilization in the inflation of automobile tires. More particularly, the present invention provides a valve which is coupled to a source of air under pressure, on the one hand, and to conventional chuck used to actuate the valve on an automobile tire to permit the supply of air thereto, on the other hand, which device permits air to be supplied to the tire until said tire is inflated to any desired selected pressure and which provides an automatic indication that air is being supplied so that this fact can be noted and the moment of complete inflation appreciated.

Accordingly, the present invention makes it unnecessary to actually measure the pressure within the tire and at the same time, the use of heavy, clumsy and expensive pressure regulating apparatus may be dispensed with. The valve of the invention is particularly characterized by its small weight and size and by the sound which is continually produced as the pressure in the tire is increased, and by the fact that the attainment of the desired pressure is indicated by the discontinuation of the aforementioned sound. It will also be appreciated that the portability provided by the valve of the invention permits this valve to be located close to the point of use which is a considerable convenience.

The invention will now be described, reference being had to the accompanying drawing in which a sectional elevation of an automatic valve constructed in accordance with the invention is illustrated.

Referring to the drawing, air enters the body of the valve 10 through an inlet 11, said inlet being intended to be connected with a source of air under pressure (not shown) by means of a suitable conduit (not shown). The movement of air through the valve is indicated by arrows.

The inlet 11 communicates with a cylindrical chamber 12 through passageway 13. The chamber 12 is confined within the valve 10, the lower end of the chamber being closed by the bottom wall 14 and the upper end being obstructed by the presence of an air pressure actuated sounding device to be later described.

Slidably mounted within the chamber 12 is a piston 15, the upper end 16 of which is of reduced diameter and the lower end of which is bored at 17 to provide a space 18 between the piston 15 and the bottom 14 of the chamber 12. A spring 19 is positioned in the space 18 to urge the piston 15 upwardly, one end of the spring 19 extending within the bore 17 and the other end being mounted on the boss 20 which extends upwardly from the bottom wall 14.

The valve 10 is provided with a second cylindrical chamber 21 and a passageway 22 provides communication between the chambers 21 and 12, the passageway 22 entering the chamber 12 at a point below the lowest point of communication between the chamber 12 and the passageway 13 so that air supplied to chamber 12 through passageway 13 cannot reach passageway 22 when the spring 19 has forced the piston 15 into its uppermost position in which passageway 22 is obstructed thereby.

The piston 15 is provided with a port 23 which provides communication between the bore 17 and an annular channel 24 formed in the side walls of the piston. Further, the chamber 12 is provided with a recess 25 communicating with the passageway 22 so that communication is enabled between the space 18 and the chamber 21 irrespective of the elevation of the piston 15 in the chamber 12 or any incidental rotation of the piston.

At this point it should be appreciated that if the pressure in the chamber 21 is the same as the pressure in the chamber 12, that the pressure in the space 18 will also be the same as the pressure in the chamber 12 and hence, the spring 19 will function to thrust the piston 15 upwardly. It will also be appreciated that when the pressure in the chamber 21 is reduced, the pressure in the space 18 will also be reduced so that the pressure in the chamber 12 will exceed the pressure in the space 18 until the pressure effected by the spring 19 is overcome, at which point the piston 15 will move downwardly to permit communication between the passageways 13 and 22, said communication not being obstructed by the upper portion 16 of the piston 15.

Referring more particularly to the chamber 21, this chamber is traversed by a stem 26 on one end of which is a flexible membrane 27 secured in place by a nut 28 and on the other end of which is a disc 29 which coacts with a valve seat 30. Membrane 27 is fixed to the chamber 21 by nut 28'.

It will be observed that the pressure in the chamber 21 acts equally against the disc 29 and the membrane 27 and hence this pressure does not tend to move the stem 26.

The nut 28 is spring biased by spring 31 in a direction tending to move the disc 29 away from its seat 30 to open the valve 10 and permit air in the chamber 21 to escape through the outlet 32. However, the pressure in the outlet 32 acts upon the side of the disc 29 remote from the chamber 21 and tends to move disc 29 against its seat 30. Hence, the escape of air from chamber 21 is wholly controlled by whether the pressure applied by spring 31 is stronger than the back pressure in the outlet 32 as will more fully be apparent from my copending application Ser. No. 522,729, filed July 18, 1955, now abandoned, and as to which the present application is a continuation-in-part.

The pressure applied by the spring 31 thus controls the pressure supplied to the tire through the outlet 32 and means are provided to regulate the force applied to the spring. These means, in the form illustrated, are constituted by a tubular housing 33 threadedly secured to the valve body 10 at 34. The lower end of the housing 33 is threaded at 35 and a second housing 36 is mounted on the threads 35 and is provided at its lower end with a bushing 37 which is adjustably secured thereto.

The lower end of spring 31 is mounted upon a bushing 38 and a ball bearing 39 is interposed between the bushings 37 and 38. Accordingly, the housing 36 may be threaded upon the housing 33 to adjust the force applied to spring 31. It will be observed that the housings 33 and 36 are provided with indicia so that the pressure to which the tire will be inflated can be easily preselected by mere manipulation of the housing 36. The bushing 37 may be used to initially adjust the device so that the indicia will read correctly.

An air actuated sounding mechanism 40 is threadedly secured at the upper end of the chamber 12, the lower extremity of which is formed with an orifice 41. The upper extremity of piston 15 is provided with a packing 42 so that when the spring 19 forces the piston 15 upwardly, the packing 42 will seal the orifice 41 so that no air can reach the sounding mechanism 40. Within the sounding mechanism 40 is a chamber 43 having an aperture 44 in a side wall thereof. A sounding member 45 is positioned adjacent the aperture 44 so that air which enters chamber 43 through orifice 41 when the piston 15 is depressed will escape through aperture 44 and impinge upon the sounding member 45 to create an audible sound which continues as long as the piston 15 is depressed. Since piston 15 is only depressed while air is exhausting through outlet 32, the sound which is produced by the sounding mechanism 40 is coextensive with the inflation of a tire and the cessation of sound is a positive indication that the tire has been fully inflated to the preselected pressure. The sounding mechanism 40 is protected by a housing 46 provided with openings 47 for the escape of air.

In operation, when a connection is completed to an under-inflated tire, the air pressure in outlet 32 is decreased so that spring 31 forces disc 29 away from seat 30 to reduce the pressure in chamber 21. The reduced pressure in chamber 21 acts to draw air from space 18 through port 23, annular channel 24 and passageway 22 to reduce the pressure in space 18. When this occurs, the pressure in chamber 12 becomes greater than the pressure in the space 18 and piston 15 moves downwardly to open the orifice 41 and permit air from a source of pressure to flow from inlet 11 to the chamber 21 through passageways 13 and 22 and around the upper portion 16 of piston 15. Thus, sounding mechanism 40 is actuated and air is supplied to the tire until the back pressure in outlet 32 is sufficient to overcome the selected force applied to spring 31. When this occurs, disc 29 is seated on its seat 30 and the pressure in chamber 21 and space 18 builds up until the pressure in chamber 12 is reached, at which time, spring 19 moves piston 15 upwardly to seal orifice 41 and obstruct the flow of air from the source of supply. Therefore, when the preselected pressure in the tire is reached, the supply of air is automatically discontinued and the sound produced by mechanism 40 is discontinued to positively indicate this fact.

Thus, the present invention provides an automatic valve which can be adjusted to automatically inflate a tire to any preselected pressure and which preferably includes means providing a sound coextensive with the period of inflation. This valve comprises a valve body defining a first and a second chamber, a resiliently biased piston slidably mounted in the first chamber for limited movement therein, inlet means communicating with the first chamber at a point above the uppermost position of the piston and a passageway communicating between the second chamber and the first chamber at a point intermediate the length of the piston when the piston is in its uppermost position. When the piston is moved down, communication between the inlet and the passageway is permitted. Further, free passage of gas between the second chamber and the portion of the first chamber beneath the piston is permitted. A stem extends across the second chamber and through upper and lower openings therein. The lower opening is closed by flexible means which permits movement of the stem and means are provided on the upper portion of the stem for coaction with a seat to close the upper opening and resilient means are provided to urge the stem upwardly to open the upper opening and permit gas to escape therethrough to an outlet.

It will be appreciated that the terms "upper" and "lower" are simply illustrative since obviously, the entire valve may be inverted or the second chamber inverted with respect to the first chamber.

I claim:

1. An automatic valve comprising a valve body defining a first chamber and a second chamber, a piston slidably mounted in said first chamber for limited movement therein, resilient means urging said piston upwardly, inlet means communicating with said first chamber at a point above the uppermost position of said piston, a passageway communicating between said second chamber and said first chamber at a point intermediate the length of said piston when said piston is in its uppermost position, said piston being movable downwardly to provide communication between said inlet and said passageway, means providing the free passage of gas between said second chamber and the portion of said first chamber beneath said piston, an upper and a lower opening for said second chamber, a stem extending across said second chamber and through said upper and lower openings thereof, yieldable means on said stem for closing said lower opening while permitting movement of said stem, a seat above said upper opening, means on the upper portion of said stem adapted to bear against said seat to close said upper opening, means resiliently urging said stem upwardly to open said upper opening and outlet means communicating with said upper opening.

2. An automatic valve as recited in claim 1 in which said means for closing said lower opening while permitting movement of said stem comprises a flexible membrane secured to said body.

3. An automatic valve as recited in claim 2 in which said resilient means urging said stem upwardly is a spring, said spring being housed within a first enclosure and a second enclosure threadedly secured to the lower portion of said first enclosure.

4. An automatic valve as recited in claim 1 in which an air-actuated sounding mechanism is positioned at the upper end of said first chamber, said sounding mechanism including an orifice communicating with said first chamber, said orifice overlying said piston whereby movement of said piston to its uppermost position closes said orifice.

5. An automatic valve as recited in claim 4 in which said sounding mechanism comprises a chamber communicating with said orifice, a sounding member and an opening in said last named chamber in communication with said sounding member, said opening directing the escape of gas from said last named chamber into said sounding member to actuate said sounding member.

6. An automatic valve as recited in claim 1 in which the means providing the free passage of gas between said second chamber and the portions of said first chamber beneath said piston comprises a port in said piston.

7. An automatic valve as recited in claim 6 in which a longitudinal recess is provided in said first chamber communicating with said passageway to provide communication between said passageway and said port when said piston is lowered.

8. An automatic valve as recited in claim 6 in which an annular chamber is provided in the side wall of said piston, said annular chamber communicating with said port.

9. An automatic valve comprising a valve body having therein an inlet means and a passageway communicating with said inlet means, valve means controlling communication between said passageway and said inlet means, resilient means normally urging said valve means to prevent communication between said passageway and said inlet means, a signal means in communication with said inlet means, said valve means providing communication between said passageway and said inlet means and between said signal means and said inlet means when the pressure in said inlet means is greater than the pressure in said passageway and sufficiently great to overcome the force of said resilient means on said valve means, a chamber in communication with said passageway, outlet means in communication with said chamber, and second valve means provided with pressure responsive means controlling communication between said chamber and said outlet means, adjustable yieldable means urging said second valve means to open position, said second valve means providing communication between said chamber and said outlet means when the pressure in said outlet means is less than a predetermined pressure.

10. An automatic valve as defined in claim 9 wherein said second valve means includes a stem extending across said chamber and through upper and lower openings in said chamber, yieldable means on said stem for closing said lower opening while permitting movement of said stem, a seat above said upper opening, means on the upper portion of said stem adapted to bear against said seat to close said upper opening, the outlet means communicating with said upper opening.

11. An automatic valve as defined in claim 9 wherein said first named valve means comprises a second chamber having therein a piston slidably mounted for limited movement within said second chamber, said resilient means urging said piston upwardly, the inlet means communicating with said second chamber at a point above the uppermost position of said piston, the passageway communicating with said second chamber at a point intermediate the length of said piston when said piston is in its uppermost position, said piston being movable downwardly to provide said communication between said inlet means and said passageway and between said signal means and said passageway, means providing the free passage of fluid between the portion of said second chamber beneath said piston and said other chamber.

References Cited in the file of this patent

UNITED STATES PATENTS

| | | |
|---|---|---|
| 1,584,934 | Harris | May 18, 1926 |
| 1,588,107 | Harris | June 8, 1926 |
| 1,805,397 | Harris | May 12, 1931 |
| 1,905,042 | Moore | Apr. 25, 1933 |
| 2,200,113 | Horn | May 7, 1940 |
| 2,225,690 | Ewald | Dec. 24, 1940 |
| 2,661,760 | Anderson | Dec. 8, 1953 |